United States Patent [19]

Alieri

[11] Patent Number: 4,518,336

[45] Date of Patent: May 21, 1985

[54] APPARATUS FOR FORMING PLASTIC MATERIAL GASKETS IN STOPPERS COMPRISING A CUP, SUCH AS SCREW-ON AND CROWN CAPS

[75] Inventor: Rodiero Alieri, Imola, Italy

[73] Assignee: SACMI Cooperativa Meccanici Imola Soc. Coop. a Resp. Lim., Imola, Italy

[21] Appl. No.: 593,069

[22] Filed: Mar. 23, 1984

[30] Foreign Application Priority Data

Oct. 7, 1982 [IT] Italy .................................. 3555 A/82

[51] Int. Cl.³ .......................... B29C 5/00; B29D 31/00
[52] U.S. Cl. .................................... 425/110; 425/257; 425/259; 425/809
[58] Field of Search ............... 425/DIG. 47, 127, 809, 425/256, 257, 110, 258, 259, 261; 264/DIG. 60

[56] References Cited

U.S. PATENT DOCUMENTS

| 2,218,456 | 10/1940 | Soubier et al. | 425/259 |
| 2,930,081 | 3/1960 | Wilkens et al. | 425/809 |
| 3,053,221 | 9/1962 | Heffley et al. | 425/809 |
| 3,422,522 | 1/1969 | Mojonnier | 425/809 |
| 3,820,578 | 6/1974 | Staba | 425/259 |
| 3,877,497 | 4/1974 | Busi | 425/809 |
| 4,293,510 | 10/1981 | George et al. | 425/809 |
| 4,295,436 | 10/1981 | Zangari et al. | 425/809 |
| 4,336,011 | 6/1982 | George et al. | 425/809 |
| 4,412,797 | 11/1983 | Murayama | 425/809 |

FOREIGN PATENT DOCUMENTS 691935 8/1964 Canada .............................. 425/809

Primary Examiner—Willard E. Hoag
Attorney, Agent, or Firm—Guido Modiano; Albert Josif

[57] ABSTRACT

The apparatus comprises a carousel carrying a plurality of peripherally distributed cups and slidable supports, respectively aligned with the axes of the cups, pick-up and metering assembly forming a spoon member facing in the direction of rotation of the carousel and adapted to be selectively placed in communication with suction and blowing means. The apparatus further includes an extruder nozzle for the plastic material which is stationary relatively to the carousel and opens at the pick-up and metering assembly so as to allow withdrawal of a metered amount of plastic material by said spoon.

5 Claims, 2 Drawing Figures

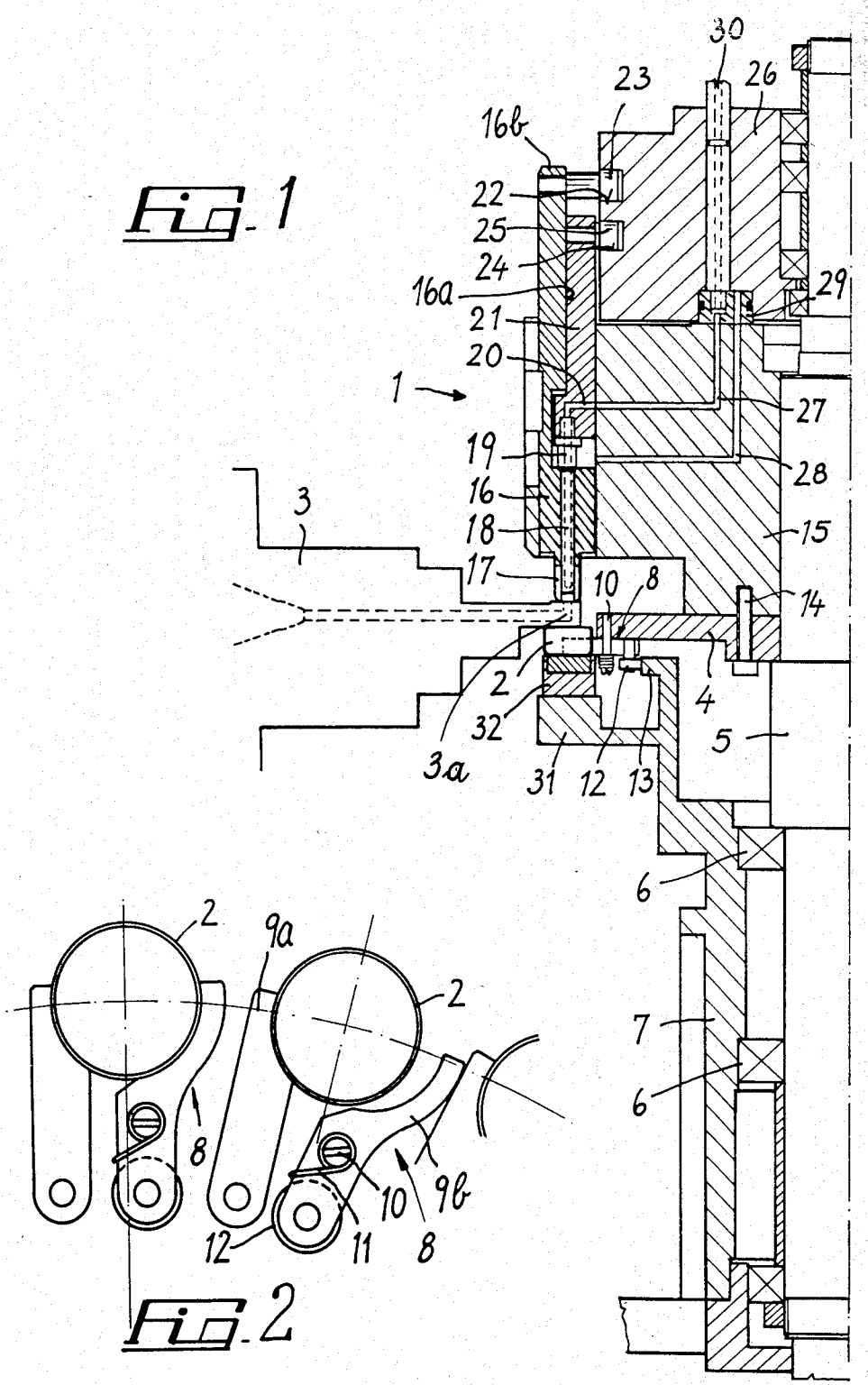

APPARATUS FOR FORMING PLASTIC MATERIAL GASKETS IN STOPPERS COMPRISING A CUP, SUCH AS SCREW-ON AND CROWN CAPS

BACKGROUND OF THE INVENTION

This invention relates to an apparatus for forming plastic material gaskets in stoppers comprising a cup, such as screw-on and crown caps.

As is known, in the manufacture of crown caps, among the various techniques used heretofore to form the cap gasket, there are some which provide for the introduction, through different arrangements into the cap metal cup, of a preset amount of an extruded plastic material, generally in a softened state, which is subsequently cold molded. The machines used to implement such prior techniques have all the problem of being unable to adequately introduce the metered extruded amount into the cap, where the latter happens to have a fairly large height dimension. In fact, current apparatus employed for the formation of said gasket substantially comprise a first carousel, which carries peripherally a plurality of metal cups, and a second carousel, or alternatively, various rotary knife devices or the like, which are arranged to operate tangentially to the path of movement of the caps to be provided with that metered amount of plastic material therein.

In all cases, the useful section for effecting said introduction of the metered amount has obviously a limited length, thereby the apparatus is required to operate at a high rate, which increases its complexity and the likelihood of faulty gaskets being formed.

It is also apparent that this imposes limitations on the carousel rotational speed or introducing device rate, thus limiting the apparatus output rate.

SUMMARY OF THE INVENTION

Thus the task of this invention is to obviate such prior drawbacks, by providing an apparatus for forming gaskets in crown caps, screw-on caps, and the like stoppers, which can afford a higher rate of operation even with a significant height of the cup, while ensuring the manufacture of a stopper which can give full assurance of a reliable seal.

Within that task it is an object of the invention to provide an apparatus of simple design, which is reliable in operation and versatile in application.

According to one aspect of the invention the above task and object, as well as yet other objects which will become more apparent hereinafter are achieved by an apparatus for forming plastic material gaskets in stoppers comprising a cup, such as screw-on caps, crown caps, and the like, characterized in that it comprises a carousel which carries a plurality of peripherally distributed cups, means for picking up and metering amounts of a plastic material which are supported slidably on said carousel, respectively in line with said cups, and forming a spoon member facing in the direction of rotation of said carousel, said picking up and metering means being adapted to be selectively communicated to suction and blowing pneumatic means, an extruder nozzle for said plastic material which is stationary relatively to said carousel and opens at said pick-up and metering means, there being further provided means of sequentially driving said pick-up and metering means between a raised position whereat a metered amount of material is picked up by said spoon member and the pick-up and metering means are connected to the suction means to retain the metered amount, and a lowered position whereat said metered amount of plastic material is introduced into said metal cup and the pick-up and metering means are connected to the blowing means to eject the metered amount out of the cup.

BRIEF DESCRIPTION OF THE DRAWINGS

Further features of the invention will be more clearly understood from the following detailed description of a preferred embodiment of this apparatus for forming gaskets in crown caps, with reference to the accompanying illustrative drawing, where:

FIG. 1 is a fragmentary, axial section view of the apparatus according to the invention; and FIG. 2 is a detail plan view of gripper means of said carousel in the apparatus.

DESCRIPTION OF THE PREFERRED EMBODIMENTS

With reference to the drawing views, this apparatus comprises essentially a carousel, generally indicated at 1, which can carry peripherally a plurality of metal cups 2 of the stoppers and cooperate with an extrusion head 3 for the plastic material; the extrusion head 3 is stationary relatively to the carousel 1.

The carousel 1 includes a plate 4 which is made rigid with a vertical shaft 5. The shaft 5 is mounted rotatably, through rolling bearings 6, within a sleeve 7 which is a part of the apparatus stationary frame.

The plate 4 has a peripheral plurality of grippers 8 designed to catch the cups 2. As shown more detailedly in FIG. 2, each gripper 8 comprises a fixed jaw 9a and movable jaw 9b. The movable jaw 9b is mounted on a pin 10 having a return spring 11, and supports an idle roller 12. The roller 12 engages with an annular cam 13 formed at the top of the sleeve 7, which is adapted to control the movable jaw 9b of the gripper 8 to open.

Fastened to the top of the plate 4, as by screw means 14, is a substantially cylindrical body 15. The body 15 carries, formed peripherally thereto, and respectively aligned with the axes of the cups 2 carried on the plate 4, vertical seats wherein there are mounted slidably means of picking up and metering the plastic material into the cups, hereinafter simply termed, for brevity, batchers.

Each said batcher comprises an axially bored cylinder 16, which defines at the bottom a spoon member 17 facing in the direction of rotation of the carousel 1. The spoon 17 is preferably fabricated by cutting in a longitudinal plane a narrow tubular portion of the cylinder 16, thereby it takes the form of a hollow half-cylinder. Mounted axially to the cylinder 16, is a small sliding tube 18 the bottom end whereof is open and extends into said spoon 17, its top end being in communication, through a fitting 19, with a hole 20 formed inside a guide 21. The guide 21 is accommodated within a seat 16a in the flattened portion 16b of the cylinder 16 such that it can slide vertically in a parallel direction to the carousel axis of rotation.

The cylinder 16 is driven vertically by a cam 22 which is engaged by a roller 23 carried at the top of the portion 16b. The small tube 18, in turn, is driven relatively to the cylinder 16 by a further cam 24, being engaged by a further roller 25 carried at the top of the guide 21.

The cams 22 and 24 are formed annularly on the outer surface of a drum 26 which is mounted aligned with the axis of the shaft 5, above the body 15 and stationary relatively to the carousel 1.

The hole 20 formed in the guide 21 is designed for selective communication with a first conduit 27 and second conduit 28, formed radially through the body 15 and opening one above the other.

The conduits 27,28 are adapted for connection, the former to a suction pneumatic means, and the latter to a blowing means. For this purpose, the conduits 27,28 opens on the upper face of the body 15 and are controlled by a ring 29 having sealing means and being recessed in the drum 26. Mounted angularly offset in the drum 26, are respective connection pipes 30 for connection to said suction and blowing means, one only of which is shown in the drawing. The sleeve 7 forms, in the proximities of its top, a flange 31 which functions as a support for a ring 32 carrying an RF heating means of a type known per se. The ring 32 is placed directly below the metal cups 2 carried on the carousel 1. The cups 2 are held by the grippers 8 slightly away from the ring 32, to prevent them from rubbing against the latter. The plastic material extrusion head 3 is equipped with a nozzle 3a which extends above the cups 2 carried on the carousel, and comprises an orifice facing vertically upwards and being adapted to be doctored by the spoon 17 as this moves past it.

The apparatus just described operates as follows. As the carousel 1 is rotated, the cylinders 16 are driven sequentially, through the stationary cam 22, to move between a raised position and a lowered position. In the raised position, the cylinders 16 move past the extruder nozzle 3a and pick up, by means of the respective spoon 17, a metered amount of the plastic material, as concurrently delivered by the extruder. During this stage, the respective tube 18 is raised from the spoon 17 and put into communication, via the conduit 27, with said suction pneumatic means, so as to impose a vacuum on the spoon 17 which favors retention of the picked up plastic material amount in the spoon itself. Subsequently, the cylinder 16, on control from the cam 22, is lowered until the spoon 17 is introduced into the metal cup 2 held firmly in the respective grippers 8. At the same time, the small tube 18 is also moved down under the drive by the cam 24. However, the travel of the tube 18 continues relatively to the cylinder so as to mechanically separate the metered amount of plastic material from the spoon. The movement into the lowered position is also effective to put the tube 18 in communication with the conduit 28 through which it is connected to said blowing pneumatic means. Thus, the desired amount of plastic material is introduced into the metal cup 2, as suitably heated through the ring 32. Blowing by said pneumatic compressor means can spread the metered amount of plastic material across the bottom of the metal cup 2, thus favoring the formation of the stopper gasket. It should be emphasized that after the metered amount of plastic material has been picked up from the extruder nozzle 3 by means of the spoon 17, the step of introducing it into the metal cup 2 is completed over a wide arc of rotation of the carousel, between the position occupied by the extruder nozzle 3 and that of a conventional stopper outlet station of the carousel.

Thus, the invention achieves its objects relating to the achievement of high operating rates and formation of faultless gaskets.

I claim:

1. An apparatus for forming plastic material gaskets in stoppers comprising a cup, such as screw-on caps, crown caps, and the like, characterized in that it comprises a carousel which carries a plurality of peripherally distributed cups, a means for picking up and metering amounts of a plastic material which are supported slidably on said carousel, respectively in line with said cups, and forming a spoon member facing in the direction of rotation of said carousel, said picking up and metering means being adapted to be selectively communicated to suction and blowing pneumatic means, an extruder nozzle for said plastic material which is stationary relatively to said carousel and opens at said pick-up and metering means, there being further provided a means of sequentially driving said pick-up and metering means between a raised position whereat a metered amount of material is picked up by said spoon member and the pick-up and metering means are connected to the suction means to retain the metered amount, and a lowered position whereat said metered amount of plastic material is introduced into said metal cup and the pick-up and metering means are connected to the blowing means to eject the metered amount out of the cup.

2. An apparatus according to claim 1, characterized in that it comprises heating means, held stationary relatively to said carousel and being located below said cups carried on said carousel.

3. An apparatus according to claim 1, characterized in that said pick-up and metering means respectively comprise a cylinder, forming at the bottom said spoon member and accommodating slidably therein a small tube which has its bottom end open to said spoon member, said cylinder and said small tube being driven by cams such that, with the cylinder in its raised position, the small tube is raised from the spoon member and connected to said suction means, whereas with the cylinder in its lowered position with the spoon member inside the cup, the small tube engages with the spoon and is connected to said blowing means.

4. An apparatus according to claim 3, characterized in that said extruder nozzle is provided with a plastic material delivery conduit facing vertically upwards and being located below said spoon member and provided with an orifice adapted to be doctored by said spoon member.

5. An apparatus according to claim 3, characterized in that the carousel comprises a plate having gripper means mounted peripherally thereto and being adapted to grip said metal cups, and a body mounted at the top of said plate and being provided with vertical seats wherein said cylinders are mounted slidably, said body being also formed with pairs of superimposed conduits the upper whereof put the small tubes in communication with the suction pneumatic means in the raised condition of the cylinders, and the lower whereof put the small tubes in communication with the blowing pneumatic means in the lowered condition of the cylinders.

* * * * *